April 17, 1945.　　E. W. BATTERSON　　2,373,739
CONTROL DEVICE
Filed July 9, 1943　　3 Sheets-Sheet 1
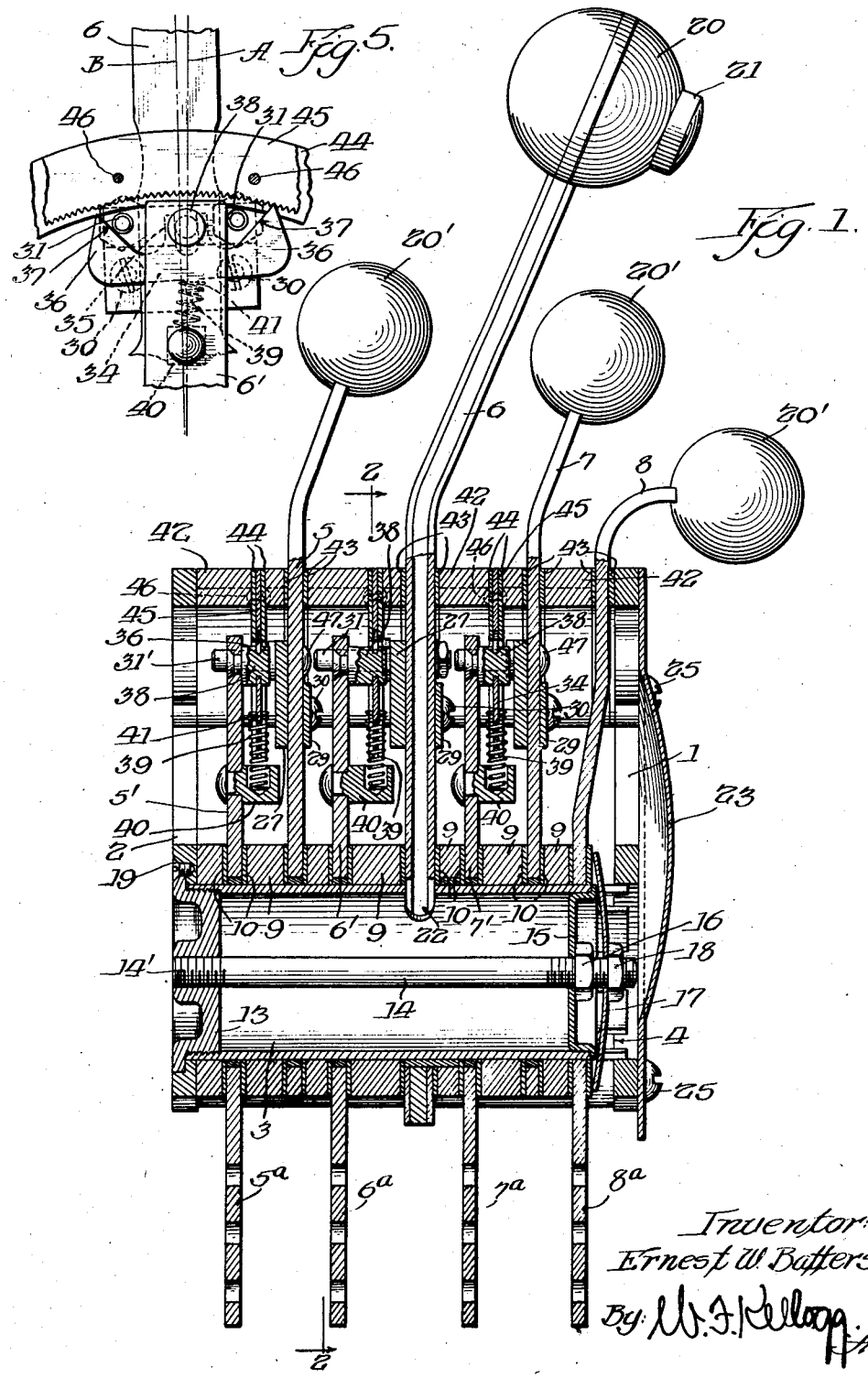

April 17, 1945. E. W. BATTERSON 2,373,739
CONTROL DEVICE
Filed July 9, 1943 3 Sheets-Sheet 2
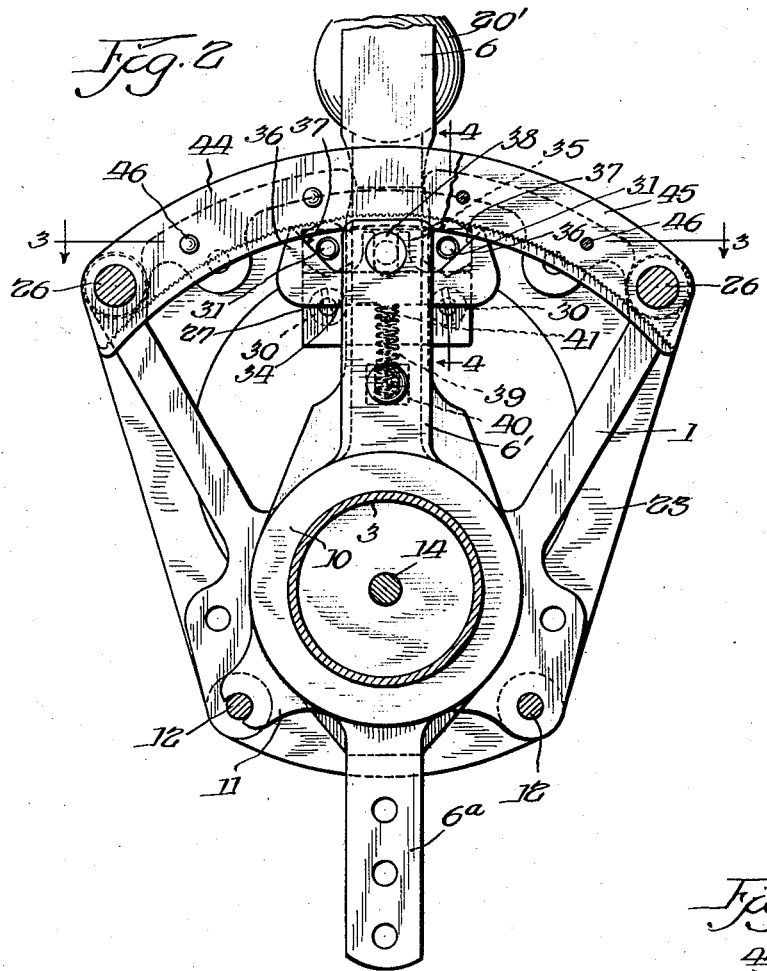
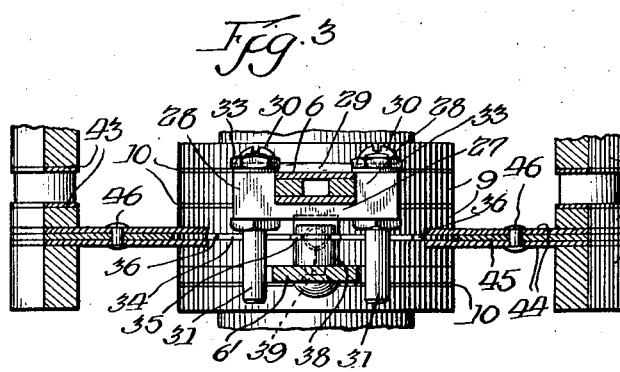
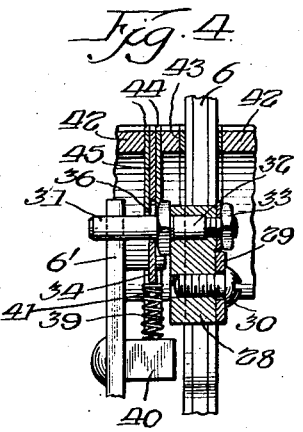
Inventor:
Ernest W. Batterson
By M. F. Kellogg, Atty.

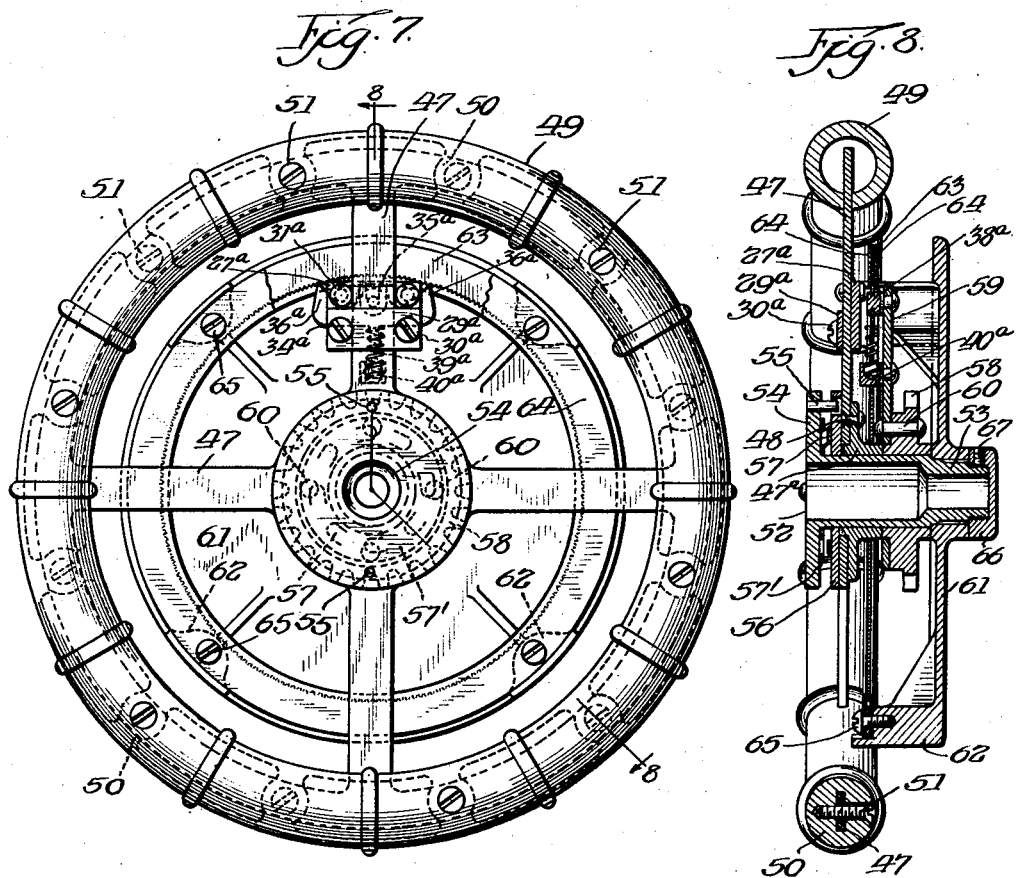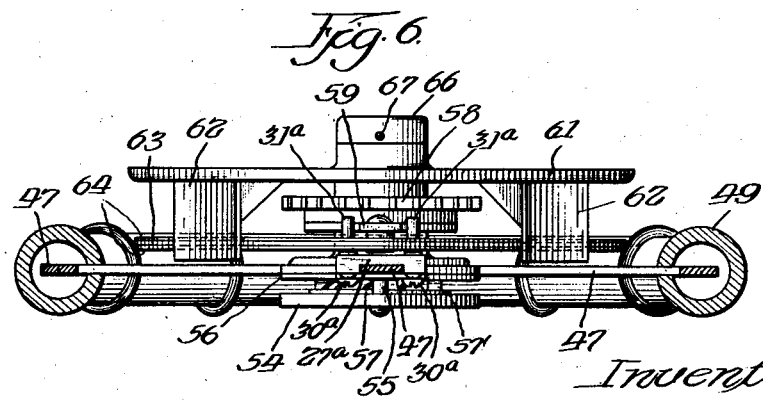

Patented Apr. 17, 1945

2,373,739

UNITED STATES PATENT OFFICE 2,373,739

CONTROL DEVICE

Ernest W. Batterson, Kalamazoo, Mich., assignor to Shakespeare Products Company, Kalamazoo, Mich., a corporation of Michigan Application July 9, 1943, Serial No. 494,087

6 Claims. (Cl. 74—536)

This invention relates to improvements in control devices such as are used in airplanes for transmitting control motion to certain of the equipment thereof, i. e. the motor throttle, motor supercharger, charge forming apparatus, variable propeller blade pitch, etc., operating mechanisms; the invention having for an object to provide a control device wherein when any one of its control levers are moved or shifted to the desired position of control or adjustment, the same will be automatically and securely retained in that position, hence ensuring a maximum of operation efficiency and satisfaction by the controlled apparatus.

It is well known that various types and constructions of control devices have heretofore been produced and used upon airplanes and other vehicles, whereby selective operation and control of different apparatuses and devices connected thereto may be effected. In general, they have been and are satisfactory insofar as concerns their function of transmitting motion of a predetermined character for operation control. However, considerable difficulty, hazard and annoyance has been occasioned the users of these devices, because of the inability of the same to ensure a continued, predetermined steady operation of the controlled mechanisms or apparatus, by positively remaining in a particular control adjusted position which, oftentimes, is of an extremely fine degree. This condition especially prevails in instances of control devices installed and used in airplanes, wherein high speed motors, generating great horsepower, are employed. By reason of the connection, direct and indirect, of the control device to the airplane motors and propellers, material vibration is transmitted thereto. As a result, the control device levers or the like are caused to "creep," i. e. to have unwarranted movement; hence rendering it difficult if not impossible, to maintain a previously established adjustment or positioning of the same.

Through the medium of the hereinafter disclosed invention, I provide a control device in which the control levers thereof are capable of being moved or shifted to effect adjustments— even though to a very fine degree, and when so actuated, will be automatically and securely locked against any and all undesired subsequent movement irrespective of the transmittal of vibration, such as above explained, thereto. Moreover, when it is desired, the previously adjusted and locked levers may be caused to be automatically unlocked and then, manually moved to other positions of adjustment, and as securely and automatically locked or relocked. Accordingly, it will be understood and appreciated by workers skilled in this art, that the hereinafter described and claimed invention will fill an urgent and important need, to-wit: it will ensure a constant and dependable control or securing of an apparatus or mechanism controlled thereby, subsequently to the making of a satisfactory or desired adjustment of the same.

Other objects of the invention will be, in part, obvious and in part pointed out hereinafter.

In order that the invention and its mode of operation may be readily understood by persons skilled in the art to which it pertains, I have, in the accompanying drawings and in the following detailed description based thereupon, set out several practical embodiments of my invention.

In these drawings:

Figure 1 is a longitudinal section through the improved control device.

Figure 2 is a similar view taken on the line 2—2 of Figure 1, looking in the direction in which the arrows point.

Figure 3 is a transverse section taken on the line 3—3 of Figure 2, looking in the direction in which the arrows point.

Figure 4 is a fragmentary longitudinal section taken on the line 4—4 of Figure 2, looking in the direction in which the arrows point.

Figure 5 is a fragmentary detail in longitudinal elevation illustrating the manner in which the locking pawl is disengaged from the ratchet sector upon pivotal movement of the primary lever in one direction.

Figure 6 is an edge or side elevation of a modified form of control, wherein the same is adapted to a single purpose trim tab wheel mechanism, with the wheel in section.

Figure 7 is a front elevation of the same, and,

Figure 8 is a transverse section, taken on the line 8—8 of Figure 7.

In the embodiment of my invention illustrated by the Figures 1 to 5, inclusive, of the accompanying drawings, I have elected to present a control assembly of the multiple lever type, i. e. a control device including throttle, combustible mixture, supercharger, and propeller blade pitch regulator and control levers. It will, however, be understood, that the types or characters and the number of regulator and control levers employed may be varied, such as conditions or preference may dictate, as for example, in the modified form of the invention hereinafter described and illustrated by the Figures 6, 7 and 8 of said drawings, without departing from the spirit or scope of the invention. Also, it is to be understood that the general construction of the lever assemblies (shown in Figures 1 to 5 inclusive), constituting the so-called control levers will correspond. Hence, except for minor structural differences and arrangements, which will be pointed out as this description proceeds, reference will be made to but one of such control lever assemblies, and such reference will substantially suffice as descriptive of the remaining illustrated control lever assemblies.

Having more particular reference to the drawings, in connection with which like characters of reference will designate corresponding parts throughout, the improved control comprises front and back frames, or quadrants 1 and 2. A hub 3 is fixedly mounted in appropriate portions of the relatively spaced quadrants 1 and 2. One end of said hub is formed with circumferentially disposed pockets or recesses 4, while its opposite end is internally screw threaded for the purpose which will be hereinafter described.

Control lever assemblies comprising, respectively, primary and secondary lever 5, 5'; 6, 6'; and 7, 7', and a single control lever 8, are pivotally mounted upon the hub 3. Each of the lever assemblies and the single control lever 8, as will be noted upon reference to Figure 1 of the accompanying drawings, are arranged in relatively longitudinally spaced relation upon the hub 3, and are so retained, by means of spacer rings 9 engaged over and about appropriate portions of the hub. Friction rings, generally identified by the reference character 10, are engaged about and over the hub 3 adjacent those sides of the spacer rings 9 facing the opposite sides of the mounted portions of the control lever assemblies (the primary and secondary levers) and the control lever. Each of these friction rings is provided with radially disposed bifurcated lugs 11, adapted to engage the adjacent portions of bolts 12, or their equivalent, interconnecting the normally inner portions of the relatively spaced quadrants 1 and 2. The various control lever assemblies and the single control lever 8, together with the spacer and friction rings 9 and 10, are retained in assembled relation upon the hub 3 by turning a retainer 13 into engagement with the internally screw threaded end of the hub 3, then passing an elongated stud 14 through said hub into screw threaded engagement with the central portion of the retainer 13, as at 14'. Thereupon, a supporting insert or disc 15 is engaged in the opposite end of the hub 3 and receives the adjacent or remaining end portion of the stud 14 centrally therethrough. A locking nut 16 is engaged with the remaining screw threaded end portion of the stud 14 and is turned into binding engagement with the adjacent portion of the disc 15. A spring spider 17 is engaged over that portion of the stud 14 outwardly of the locking nut 16 and has its legs engaged in certain of the circumferentially spaced pockets 4 formed in the adjacent end of the hub 3. The outer ends of the thus engaged legs of the spider 17 are springly engaged with adjacent portions of the outermost friction ring 10, and the extent or degree of such engagement is regulated by engaging a locking nut 18 over the outer screw threaded end portion of the stud 14 and turning the same into binding or thrust engagement with the medial portion of the spider 17. If desired, a cotter pin (not shown), or like device, may be engaged with adjacent portions of the stud 14 and the locking nut 18, and by the same taken, a locking screw 19 may be turned into engagement with appropriately provided portions of the quadrant 2 and the retainer 13, in order that the latter will be prevented from having undesired rotary movement.

At this point, it may be noted that the primary lever 6—the throttle control lever—is of greater length than the remaining control levers, and is hollow throughout its entire length, whereby to permit the longitudinally passing of electric conductors (not shown) therethrough into engagement with suitable electrical circuit closing means provided within the handle or knob 20 of said lever, said circuit closing means not being shown save for its push button 21, which engages through an opening in the knob 20 and is disposed conveniently for engagement by the hand of a user. The hub 3, in some instances, may be formed with a slot or other opening 22 adjacent the open inner end of the hollow throttle control lever 6 so that the heretofore referred to electric conductors in said throttle lever may be passed therefrom into the hub and thence, into engagement with radio signal apparatus.

As in the instance of the throttle lever 6, the remaining primary levers 5 and 7 of the herein referred to control lever assemblies, and the control lever 8, are each provided with knobs or handles 20' upon their outer ends.

A cover plate 23 may be and preferably is provided the front quadrant 1 and is adapted to be secured in position by means of screws 25 engaged therethrough and in the bolts 12 and 26, which serve to interconnect the front and back quadrants 1 and 2.

As heretofore stated, each of the control lever assemblies 5, 5'; 6, 6'; and 7, 7' are constituted by primary and secondary levers. The motion of the primary lever of each assembly, as when it is pivotally moved on the hub 3, is transmitted to and reproduced in its particular secondary lever, from whence control or regulating motion is transmitted to the device or apparatus connected thereto. To effect this relaying of motion from a primary control lever to its secondary lever, and referring, particularly, to the control assembly comprising the primary lever 6 and its secondary lever 6', the former has a plate bracket 27 arranged adjacent one side of an intermediate portion thereof, (see Figures 1, 3 and 4 of the drawings). The opposite end portions of the bracket are thickened or ribbed, as at 28, and snugly receive a portion of the primary lever 6 therebetween. Screw threaded openings are formed in the portions 28. A strap bracket 29 is transversely engaged over the adjacent opposite side of the primary lever 6, and has securing screws 30 passed therethrough into said screw threaded openings in the portions 28. Thus, the bracket 27 will be fixedly connected to the primary lever 6.

Relatively laterally opposed and inwardly spaced shouldered pins 31 having anchoring shanks 32 are provided the plate bracket 27. The shanks 32 are engaged in openings formed in the portions 28 in proximity to those openings therein receiving the screws 30, and are immovably locked or connected thereto by lock-nuts 33, engaged with the screw threaded ends of the same. The spacing between the pins 31 is such that they will somewhat loosely receive an adjacent portion of the secondary lever 6' therebetween, as will be observed upon reference to Figures 2 and 5 of the drawings. Consequently upon this relative arrangement between the primary levers 5 and 6', the same will be interconnected in such a fashion that motion will be transmittable from one to the other.

In order that the primary and secondary levers 6 and 6' may be releasably locked in adjusted positions with relation to the quadrants 1 and 2, I position a double pawl transversely of the normally inner end portion of the secondary lever 6', adjacent and parallel to that side of the same facing the plate bracket 27 and its spaced pins 31. This particular element, consists of a body 34, having a forked bearing 35 on its intermediate inner marginal portion, and correspondingly disposed pawls or dogs 36 upon its opposite ends, the reduced or bite portions of which are directed toward the outer sides or sectors of the quadrants 1 and 2. The relative inner sides of each of the pawls or dogs 36 are formed with oblique or inclined bearing surfaces 37 adapted, at times, to be engaged by the particularly adjacent pins 31. A grooved retaining pin 38 is fixedly engaged with the inner side of the secondary lever 6' and slidably receives the forked bearing 35, carried on the intermediate portion of the pawl body 34, thereover. To normally maintain the double pawl in locking engagement with its particular ratchet sector, to be presently described, I provide an expansible coiled spring 39, engaging one end thereof in the pocket of a spring retaining pin 40 connected to an appropriate portion of the secondary lever 6ª, and its remaining end, over a finger or lug 41 provided intermediately of the inner marginal portion of the pawl body 34, preferably opposite the forked bearing 35.

Arcuate lever guide spacers or sectors, generally indicated by the numeral 42, are provided at the normally upper or outer portions of the front and back quadrants 1 and 2, and as will be understood, serve to guide or direct the levers 5, 6, 7 and 8, through predetermined paths of travel during their respective pivotal adjustments or operations. Friction sectors 43 are arranged at certain of the sides of these arcuate guides 42 adjacent the opposite sides of the various levers 5, 6, 7 and 8. In addition to the arcuate guides 42 and the friction sectors 43, it will be noted, especially upon reference to Figures 1, 3 and 4, that I arrange paired arcuate pawl retaining guides or sectors 44 between certain of the opposite sides of the guides 42. In particular, it will be noted that the arrangement or positioning of said pawl retaining guides is such that they will be substantially opposite the normally outer or bite ends of the pawls 36. Ratchet sectors 45 are received between the paired pawl retaining guides 44 and, as shown in Figures 1, 3 and 4, have their respective ratchet faces inwardly offset with respect to the inner marginal portions or sides of such guides. Rivets 46, or similar fastening devices, are preferably passed through appropriate portions of the guides 44 and their respective ratchet sectors 45, whereby to fixedly interconnect the same and insure their retention in immovable assembled relationship.

Tie bolts 26 are passed through appropriately formed portions of the quadrants 1 and 2 and through aligning openings formed in the guides and sectors 42, 43, 44 and 45, to effect their relative and fixed interconnection.

Upon referring to Figures 1, 2 and 5 of the accompanying drawings, it will be noted that the bite extremities or portions of the pawls or dogs 36 are adapted to be engaged between the teeth of their particular ratchet sectors 45, and that in effecting such engagement, they will be engaged inwardly of the adjacent or inner sides of their respective pair of pawl retaining guides 44. Consequently, any and all possibility of lateral disengagement or disalignment of the pawls 36 from their respective ratchet sectors, will be prevented. Because of the engagement of the relatively opposed pawls 36 of the double pawl body 34 with the ratchet teeth on the inner side of their particular sector 45, said double pawl will have a normal tendency or urge to press into positive engagement with the sector teeth at those times when vibration of or pressure on their secondary levers 5', 6' or 7' exerts side or lateral thrust to the pawl portions 36. That is, lateral pressure on these pawl portions increases their ratchet teeth engaging efficiency, rather than reduce the same, as would be the case if the construction were designed to apply such pawl portions onto the outer marginal portion of a similar ratchet sector.

At this point it may be noted that the construction of the pins 31' of the secondary levers 5' and 7' somewhat slightly differs from that of the hereinbefore described pins 31 of the secondary lever 6'. In the instance of the pins 31', their shank portions are of less length than the shank portions 32 of pins 31, by reason of the lesser width or thickness of their particular plate brackets; moreover, the shank portions of these pins 31' are fixedly connected to their respective secondary levers by upsetting or swaging their outer ends, as indicated at 47, instead of being screw threaded and having lock nuts 33 engaged therewith.

The secondary levers 5', 6' and 7' are each formed or otherwise provided with apertured extensions 5a, 6a and 7a, which, as will be understood, are adapted to be connected, through linkage or other suitable forms of connection, to the particular devices or apparatus to be controlled or regulated thereby. The lever 8 is provided with a similar apertured extension 8a, for like usage.

In operation of my improved control device and assuming, for the purpose of illustration, that the throttle lever 6 is to be adjusted or shifted for effecting regulatory control of the particular engine throttle or throttles connected thereto, the knob 20 is grasped by the user and is thrust in the particularly desired direction of adjustment. Assuming that this thrust is to the left so that the primary lever 6 is moved to the position indicated by the line B of Figure 5 of the drawings, the leading pin 31 carried by said lever, will engage over the inclined bearing surface of the adjacent pawl portion of the body 34, forcing the same inwardly and so, disengaging it from its particular ratchet sector 45, against the tension of the spring 39. At this time, the secondary lever 6' will be free to move to a desired position. With continued movement of the primary lever 6 to the left, the remaining or following pin 31 carried thereby, will be moved into engagement with the adjacent marginal portion of the secondary lever 6' in order that it will be collectively shifted or moved along with the primary lever 6. When pressure upon the lever 6 is released, that is, it is allowed to take the position indicated by the line A, pressure upon the aforesaid leading pin 31 will be discontinued. Thereupon, the double pawl 34, under urge from the spring 39, will re-engage with the ratchet sector 45. Thus, the secondary lever will be locked or relocked against undesired pivotal shifting or creeping motion with respect to the quadrants 1 and 2. It will be understood that with the application of pressure to either of the inclined bearing surfaces 37 of the pawls or dogs 36, the opposite thereof will remain engaged or in contact with its particularly adjacent portion or teeth of the ratchet sector 45, and that with further application of pressure, the double pawl construction will fulcrum at the point of engagement or contact of the opposite pawl or dog with the ratchet sector 45, as shown in Figure 5 of the accompanying drawings. Obviously, the slidable connection between the forked bearing 35 of the pawl body 34 and the pin 38, will allow the necessary relative movement between these elements and yet, will maintain positive connection between said double pawl and its particular secondary lever.

When shifting or adjustment of the primary lever 6 is desired to be effected in a direction opposite to that above described, it will be understood that the action of the double pawl and the pins 31 will be reversed, but that in all other respects, will be the same.

Manifestly, the mode of adjustment or operation of the control lever assemblies 5, 5', and 7, 7', corresponds to that of the control lever assembly 6, 6'.

The operation requirements of the control lever 8, as will be well understood by workers skilled in this art, are not such as to require pawl and ratchet locking of the same against subsequent shifting motion, such as may be caused by the transmission of vibration thereto. For example, this type of lever may be employed to effect control or regulation of the combustible mixture flow or supply to the engines of an airplane from a suitable charge forming device connected thereto.

In Figures 6, 7 and 8 of the drawings, I have shown the invention adapted to a single purpose tab wheel mechanism, which as will be understood, is employed, particularly, in airplanes for actuating the wing or other tabs through motion transmitting means, where the wheel can be revolved continuously as many times as necessary, and with making of the desired control adjustments, will be immediately and automatically locked in any desired position. The trim tab wheel, generally, comprises a rotative hub 47a to which the inner end portions of the legs of a spider 47 are riveted or otherwise suitably connected, as at 48. The annular outer portion or body of the spider receives a more or less hollow hand ring 49 about and over the same, for an obvious purpose. Said ring may be made of plastic and is provided with internal equi-spaced webs 50 through which securing screws 51 are passed through ways opening on to one side of the ring, as well as aligning openings formed in the spider body. Hence, fixed connection between the spider and the hand ring is effected.

A mounting hub 52, in the form of a tubular body having its normally outer end portion reduced and screw threaded, as at 53, and its inner end portion annularly flanged, as at 54, receives the tab wheel hub 47a. The flange 54 carries a plurality of inwardly extended pins 55 adapted to engage in appropriate ways in adjacent portions of a stationary friction disk 56 engaged about the mounting hub and positioned between the tab wheel hub and said flange. Friction springs 57, off-struck from or otherwise provided the ring 57', adjacent the inner face of the flange 54, engage with the near face of the stationary friction disk 56, for a purpose which will be understood. A rotative sprocket 58 is mounted on the hub 52 adjacent the outer end of the wheel hub 47a and, of course, is adapted to receive a chain (not shown) thereabout, so that control motion may be transmitted from the control wheel to mechanism to be operatively controlled thereby (also not shown). The sprocket 58 has a radially disposed arm or secondary lever 59 mounted upon and fixed to its inner side, as at 60, and this arm or secondary lever serves as the carrier for the lock pawl to be presently described.

Engaged over the reduced portion 53 of the mounting hub 52 is a centrally apertured and flanged circular cover 61. The outer portion of the cover is formed or otherwise suitably provided with a plurality of inwardly extending right-angularly disposed fingers 62, intermediately thickened and formed with marginally opening screw threaded ways, as shown in Figure 8 of the drawings.

A stationary ratchet ring assembly is positioned adjacent the inner ends of the fingers 62. Said assembly consists of a ratchet ring or annulus 63 having teeth formed in and along its inner periphery, positioned between retaining guide rings 64, with its ratchet tooth provided portion inwardly offset from the inner periphery of said guide rings. Screws 65 are passed through the ratchet ring assembly into engagement with the above referred to screw threaded ways and, obviously, serve to fixedly mount the same upon the cover 61. It will be seen that upon engagement of the locking pawl (hereinafter more fully described) between the teeth of the ratchet ring 63, the bite portions or extremities of said pawl will be engaged inwardly of the adjacent portions of the guide rings 64. Therefore, lateral disengagement of the same from the ratchet ring will be prevented.

To secure the aforesaid elements in assembled relation on the mounting hub 52, a cap-nut 66 is engaged with the screw threaded end of its reduced end portion 53 and is locked thereon by engaging a set-screw 67 therethrough and with an adjacent portion of said reduced end 53.

If desired, the sprocket 58 may be replaced by a sheave, bell-crank and linkage, or other suitable mechanism, such as conditions or preference might dictate.

With a view toward providing means whereby the spider 47 (corresponding to the primary levers 5, 6 and 7 of the form of invention described in Figure 1) and the arm or secondary lever 59 may be collectively rotated and moreover, releasably locked in adjusted positions with relation to the cover 61 and guide rings 64, a plate bracket 27a has saddle-like transverse engagement over an intermediate portion of one of the legs of the spider 47 (see Figures 6 and 8). A strap bracket 29a is correspondingly engaged over the opposite side of the spider leg and has securing screws 30a engaged therethrough with adjacent portions of the plate bracket 27a. Relatively laterally opposed and spaced pins 31a are carried by the opposite end portions of the plate bracket 27a and, as will be noted, have somewhat loose or embracing-like engagement with an adjacent portion of said arm or secondary lever 59. In consequence, it will be seen that the spider 47 and the arm 59 are interconnected in such fashion that motion will be transmittible from the former to the latter.

An intermediate portion of the arm or secondary lever 59 is provided with a transversely positioned double pawl 34a, adjacent its normally inner side and facing the plate bracket 27a. An intermediate marginal portion of the pawl is provided with an outwardly extending forked bearing 35ª, while the opposite extremities thereof carry correspondingly disposed pawls or dogs 36ª, the reduced or bite portions of which are engageable with or between the relatively offset portions of the guide rings 64. The relative inner sides of each of the pawls or dogs 36ª are obliquely disposed to provide inclined bearing surfaces. Such surfaces, at times, are engaged by the particularly adjacent pins 31ª, aforesaid. The forked bearing 35ª is slideably engaged over a peripherally grooved retaining pin 38ª fixed to the adjacent side and outer end portion of the arm or secondary lever 59. The double pawl 34ª is normally urged into engagement with the teeth of the ratchet ring 63 by means of an expansible coiled spring 39ª, having one of its ends engaged with an adjacent intermediate portion thereof and its remaining end seated or engaged in the pocket of a retaining pin 40ª mounted on an appropriate portion of said arm 59.

In operation of the above described modified form of the invention, it will be understood that the trim tab wheel may be rotated or revolved as many times as are necessary to effect the transmission of control motion therefrom to the particular mechanism connected thereto. Assuming that said wheel is rotated in a clock-wise direction, it will be seen that the pin 31ª arranged to the right of the spider leg carrying the bracket 27ª, will engage over the inclined bearing surface of the adjacent dog 36ª, forcing the same inwardly and thereby, disengaging it from the ratchet ring 63 against the tension of the spring 39ª. Thereupon, the arm or secondary lever 59 will be free to move, collectively, with the trim tab wheel in clock-wise direction. With continued clockwise rotative movement of the wheel, the remaining or following pin 31ª on the plate 27ª will be moved into engagement with the adjacent marginal portion of the arm 59 and thus, will rotatively connect it with the trim tab wheel. Said wheel may now be rotated or revolved in order that the necessary operative control motion will be transmitted from the sprocket 58 to the particular mechanism connected thereto, as hereinbefore described. when the desired or necessary adjustment of such mechanism has been effected and clock-wise pressure upon the trim tab wheel is released, it will be seen that the double pawl 34ª will be caused to automatically re-engage with the particularly adjacent portion of the ratchet ring 63 under urge from the spring 39ª. In this manner, the arm or secondary lever 59 will be locked or relocked against undesired rotative shifting or creeping motion with respect to the ratchet ring assembly and the cover 61. As in the instance of that form of the invention disclosed in the preceding embodiment of the same, it will be understood that with the application of pressure to either of the inclined bearing surfaces of the dogs 36ª, the opposite one will remain engaged between its particularly adjacent teeth on the ratchet ring 63, and that with further application of pressure, the double pawl construction will fulcrum at the point of engagement or contact of the opposite pawl with the ratchet ring 63. Moreover the slidable connection between the forked bearing 35ª of the double pawl 34ª and the pin 38ª, will permit relative movement between such elements, and also, will maintain positive connection between the double pawl and the arm or secondary lever 59.

I claim:

1. A control device, including a hub, guide means thereon, ratchet means immovably mounted adjacent a portion of the guide means, a primary lever pivotally mounted on the hub, a secondary lever pivotally mounted on the hub in cooperative relation to the primary lever, relatively opposed pawls supported from a portion of the secondary lever for movement substantially longitudinally thereof lockingly engageable with said ratchet means, certain of the sides of said pawls having inclined bearing portions thereon, and relatively laterally opposed and spaced pins on the primary lever in proximity to said pawls embracingly engaging a portion of the secondary lever and individually engageable, upon pivotal movement of said primary lever in a predetermined direction, with and along the inclined bearing portions of certain of said pawls.

2. A control device, including a support, a primary lever mounted on the support, a secondary lever mounted on the support, fixed ratchet means in proximity to said primary and secondary levers, relatively opposed fixedly interconnected pawls pivotally mounted on one of said levers normally engaged with the teeth of said fixed ratchet means, certain of the sides of each of said pawls having cam surfaces thereon, and means carried by the remaining lever embracingly engaging the first lever and engageable with and over the cam surfaces of said pawls and with the adjacent sides of the first lever upon pivotal movement of the remaining lever whereby to disengage one of the pawls from the teeth of said ratchet means and cause collective pivotal movement of the first lever.

3. A control device, including a support, an operating lever mounted on the support, an operated lever mounted on the support, fixed ratchet means in proximity to said levers, a spring pressed body movably supported upon one of said levers and movable longitudinally of the same, pawls carried on the opposite ends of said body normally engaged with the teeth of said fixed ratchet means, the inner sides of each of said pawls having a cam surface thereon, and laterally extending pins carried by the remaining lever embracing a portion of the first lever and selectively engageable with and over the cam surface of one of said pawls and with the adjacent side of the first lever upon pivotal movement of the remaining lever, whereby to disengage said pawl from the teeth of said ratchet means and cause collective pivotal movement of the first lever.

4. A control device, including a support, an operating lever mounted on the support, an operated lever mounted on the support, fixed ratchet means in proximity to said levers, a spring pressed body slidably carried on said operated lever movable longitudinally of the same, relatively spaced pawls on said body normally engaged with the teeth of said fixed ratchet means, certain of the sides of each of said pawls having cam bearing surfaces thereon, and relatively spaced laterally extending pins carried by the operating lever embracingly receiving a portion of the operated lever therebetween, said pins being individually engageable with and over the cam surface of the adjacent pawl upon pivotal movement of said operating lever in a predetermined direction whereby to disengage said pawl from the teeth of said ratchet means.

5. A control device, including a support, primary and secondary levers mounted on the support in proximity to each other, fixed ratchet means in proximity to one of said levers, a spring pressed body pivotally and slidably mounted on one of said levers, relatively opposed pawls on said body engageable with the teeth of the fixed ratchet means, certain of the sides of each of said pawls having cam surfaces thereon, and means carried by the remaining lever straddlingly engaging the first mentioned lever and engageable with and over the cam surfaces of said pawls and with the adjacent sides of said first lever upon pivotal movement of said remaining lever whereby to disengage one of the pawls from the teeth of the ratchet means and cause collective pivotal movement of said first lever.

6. A control device, including a support, primary and secondary levers mounted on the support in proximity to each other, fixed ratchet means in proximity to one of said levers, a spring pressed body disposed transversely of and pivotally and slidably mounted on one of said levers, relatively opposed pawls fixedly carried on said body engageable with the teeth of the fixed ratchet means, the relatively inner sides of each of said pawls having inclined bearing surfaces thereon, and means adjustably carried by the remaining lever straddlingly engaging the first lever and selectively engageable with and over the inclined bearing surfaces of said pawls and with the adjacent sides of said first lever upon pivotal movement of the remaining lever whereby to disengage one of said pawls from the teeth of said ratchet means and cause collective pivotal movement of the first lever.

ERNEST W. BATTERSON.